United States Patent [19]
Yuda

[11] Patent Number: 5,245,911
[45] Date of Patent: Sep. 21, 1993

[54] CYLINDER ASSEMBLY AND METHOD

[76] Inventor: Lawrence F. Yuda, P.O. Box 499, Westminster, S.C. 29693

[21] Appl. No.: 949,460

[22] Filed: Sep. 22, 1992

[51] Int. Cl.$^5$ .............................................. F01B 28/00
[52] U.S. Cl. ..................................... 92/128; 92/169.1
[58] Field of Search ............... 92/169.1, 128; 285/305, 285/321

[56] References Cited

U.S. PATENT DOCUMENTS

| | | | |
|---|---|---|---|
| 1,464,386 | 8/1923 | Ingram | 285/305 |
| 4,167,134 | 9/1979 | Yuda | 92/163 |
| 4,192,225 | 3/1980 | Moyer | 92/169.1 |

Primary Examiner—Edward K. Look
Assistant Examiner—F. Daniel Lopez
Attorney, Agent, or Firm—Ralph Bailey

[57] ABSTRACT

A fluid operated cylinder assembly has an end cap wherein a wire key connection for retaining the end cap within a cylinder has a leg (B) on one end received within a slot (A) on the outer surface of the end cap has a crimped portion (D) at an opposite end being carried at an angle to permit insertion through an anchor passage (C) in the cylinder wall which may be bent to confine the wire key against dislodgement during continuous use. The wire key has an intermediate arcuate segment (E) which is preformed. The method contemplates first inserting an end cap within the cylinder exposing the anchor passage to permit insertion of the crimped end of the wire key and thereafter the leg (B) on the opposite end into the slot in the end cap after return of the end cap to locking position with subsequent further crimping or bending of the crimped end of the wire key to lock same into position.

4 Claims, 4 Drawing Sheets

Fig. 5.
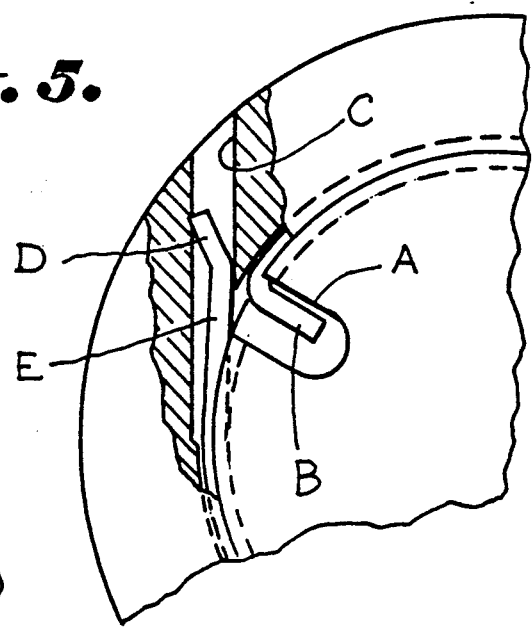
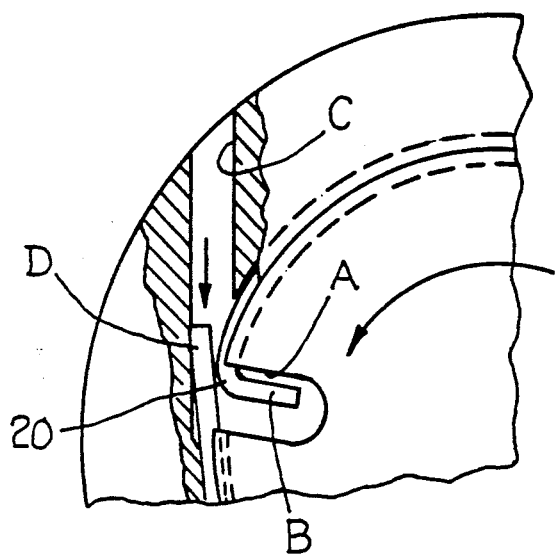
Fig. 6.
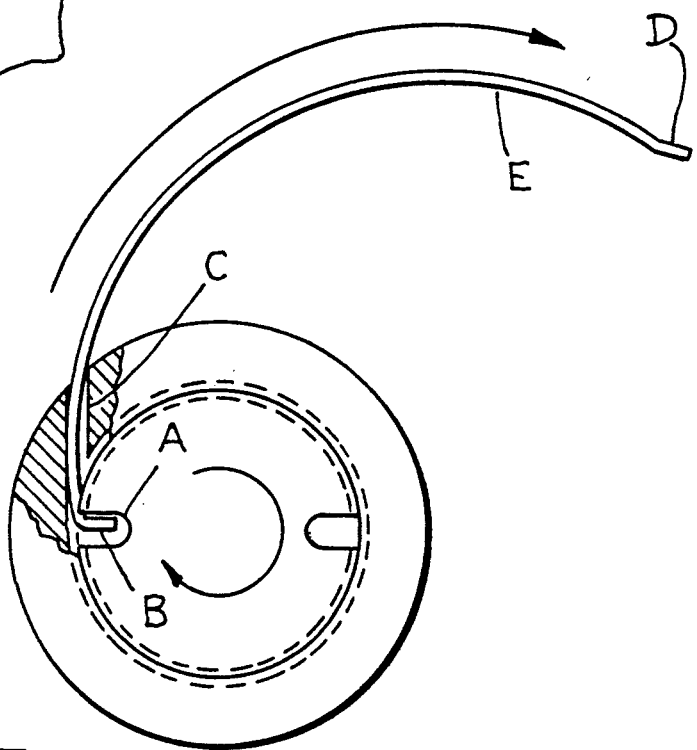
Fig. 7.

CYLINDER ASSEMBLY AND METHOD

BACKGROUND OF THE INVENTION

This invention relates to a cylinder assembly having an improved retaining apparatus and method of assembly and disassembly.

The cylinder with end cap and retaining means including a pre-crimped end for securing the wire key in locked position is suitable for use in a number of structures including that of U.S. Pat. No. 4,167,134 upon which this invention is an improvement. The invention is also particularly useful in apparatus constructed in accordance with U.S. Pat. Nos. 4,492,400 and 4,566,727.

It has been found that the vibration and abuse to which the cylinders are subjected as a result of repeated operation is rapid sometimes causing dislodgement of the key or retaining member which secures the end caps in position. It is common practice in the prior art to use a pair of spaced metallic retaining rings, but such must be placed on each side of the end cap increasing the length requirements of the cylinder. Moreover, the tolerances required make for difficult installation and maintenance of the cylinder construction.

Accordingly, it is an important object of this invention to provide effective structure for permitting smaller cylinders in that a single retaining member may be utilized which is intermediate the opposite ends of the end caps and reduces tolerance requirements.

Another important object of the invention is to provide a miniaturized cylinder construction, a single wire key for positioning end caps which is easily installed and which is retained through repeated rapid operation during usage.

Still another important object of the invention is to provide a positioning means for retention of a wire key for positive positioning of same for retaining the end caps of the cylinders in repeated operation and yet which may be retained when desired.

SUMMARY OF THE INVENTION

It has been found that wire keys may be provided for retaining end caps in cylinder assemblies wherein an end of the wire key is crimped marking the location for additional bending for retaining the wire key for positive securement of the end cap during repeated operation. The method contemplates first passing the end cap beyond an anchor passage for receiving the wire key and then moving the end caps in position for securement of one end of the wire key preparatory to turning the end cap bringing the wire key into position wherein the crimped end may be bent further for positive locking within the anchor passage. For disassembly the end cap may be turned slightly more than 360° so that the crimp is partially straightened facilitating removal of the key. Preferably the crimped end is bent outwardly as shown in the drawings, but it may be bent inwardly. The wire keys are preferably pre-crimped or partially pre-crimped, but they may be crimped at the time of assembly of the end caps.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is an enlarged plan view illustrating an anchoring of the bent end of the wire key within the anchor passage;

FIG. 6 is a plan view illustrating the straightening of the locking bend in the wire by winding the end cap an additional amount returning the wire substantially to the original end for removal;

FIG. 7 is a plan view illustrating removal of the wire preparatory to removing the end cap;

DESCRIPTION OF A PREFERRED EMBODIMENT

The drawings illustrate a fluid operated cylinder assembly having a cylinder wall, a piston and a fluid port. An end cap has a pair of opposed slots A each forming a recess opening at an outer end surface of the end cap. A wire key has a leg B on one end thereof extending at an angle thereto inwardly in respect to the cylinder and the end cap. A first anchor groove for receiving an inside portion of the wire key which extends about the end cap and opens into the slot, and a second anchor groove extends about the cylinder wall adjacent an end thereof opposite the first anchor groove for receiving an outside portion of the wire key. An anchor passage C is provided in the cylinder through which the wire key may be inserted leg first. A crimped portion D is provided at the other end of the wire key being bent and extending in a direction out of alignment with, preferably outwardly, and in the same plane as the leg at an angle permitting passage thereof through the anchor passage in said cylinder. The crimped portion marks a position defining an intermediate arcuate segment E of the wire key between the leg B and the crimped portion D wherein the wire key may be bent further out of alignment with and in the same plane as the leg for locking the wire key in position for retaining the end cap during repeated use of the cylinder.

Figure 1:
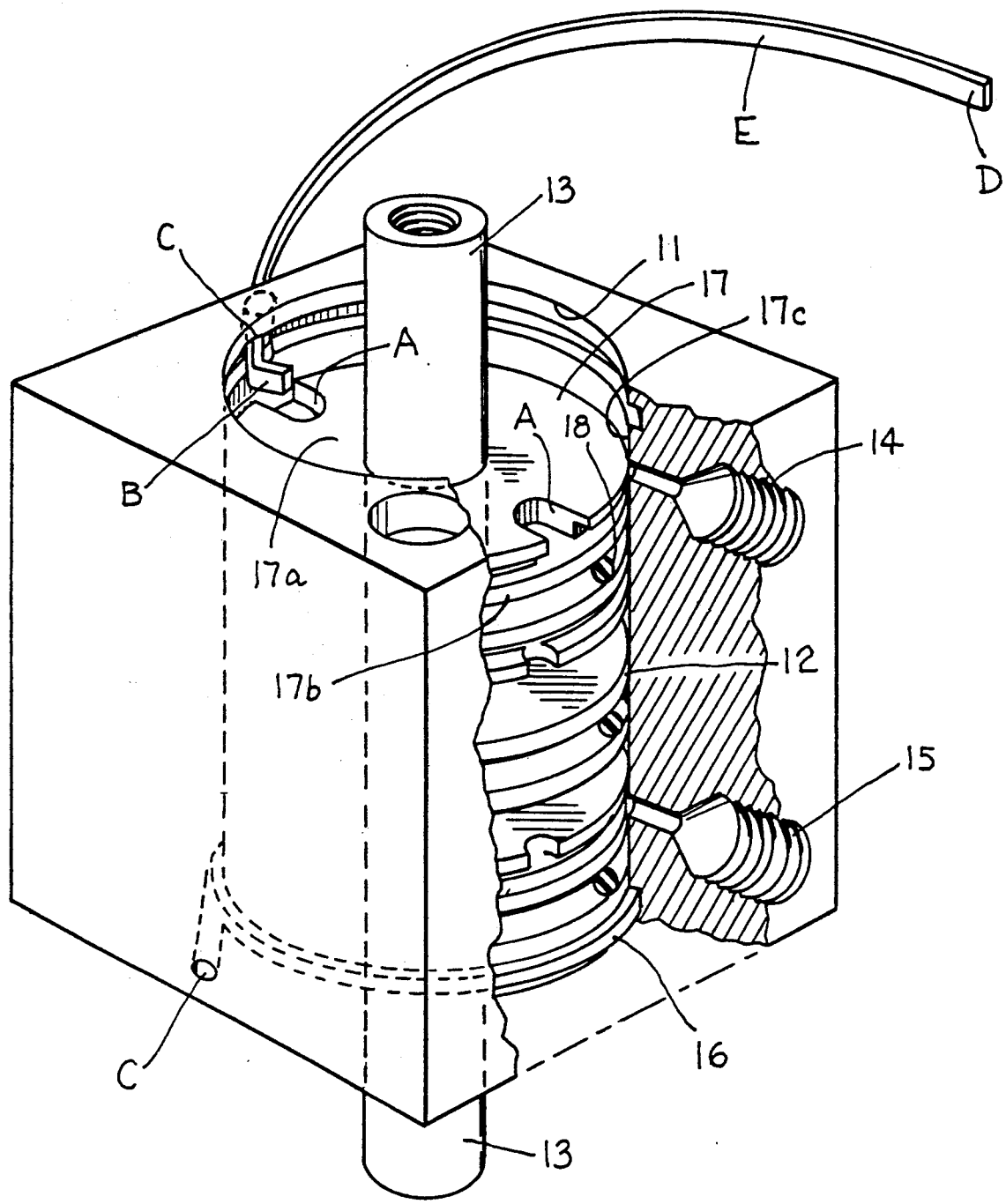
FIG. 1 is a perspective view illustrating an end cap being received in a cylinder beyond an anchor passage for reception of a leg carried by an adjacent end of a wire key.
Figure 2:
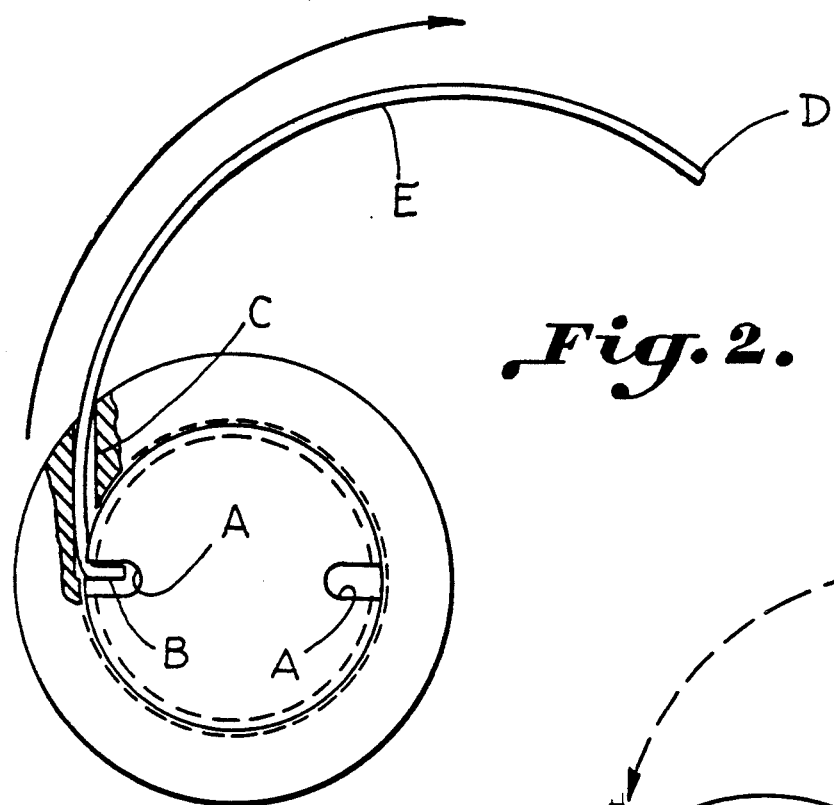
FIG. 2 is a plan view illustrating the insertion of a wire key through the interiors of the bore of the anchor passage end which is hooked in a notch or slot on the end cap.
Figure 3:
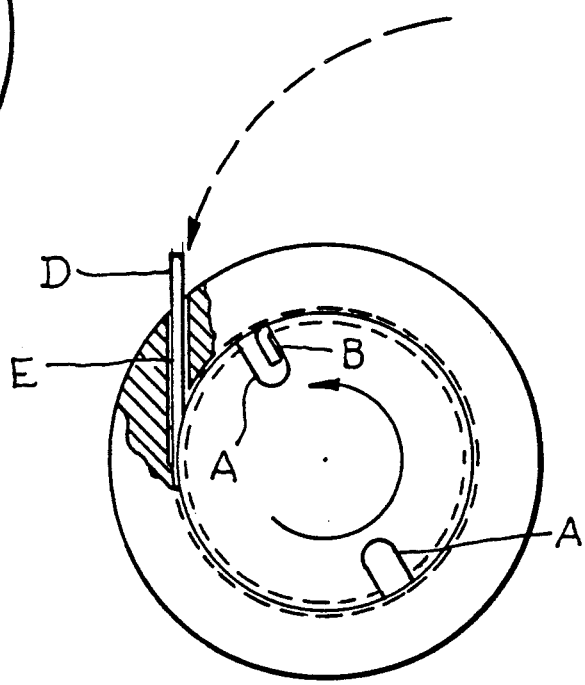
FIG. 3 is a plan view illustrating the wire key which has a bent arcuate intermediate portion which is wound into complementary portions of a groove formed between the cylinder wall and the end cap stop at the crimped or end portion of the wire key preparatory to crimping.
Figure 4:
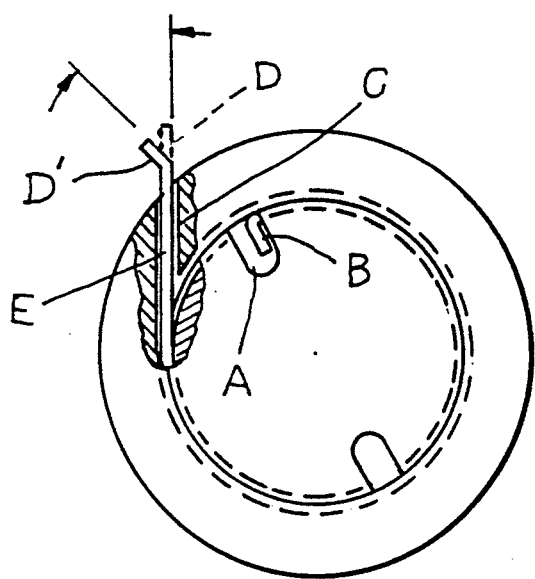
FIG. 4 is a plan view illustrating a wire being bent or crimped 30° to 45° at the crimped end portion.

FIG. 1 illustrates a fluid operated cylinder 10 having a cylinder wall 11 receiving a piston 12 having a piston rod 13 carried thereby extending above and below the piston. A pair of suitably spaced fluid ports 14 and 15 are provided for operating the double acting cylinder on either side of the piston 12 and a pair of spaced end caps 16 and 17 are provided adjacent each end of the cylinder.

The invention will be described in connection with the end cap 17 although similar features are also preferably utilized in connection with the end cap 16. In instances when only one end cap is utilized, the device hereof may be utilized with it.

The end cap 17 has an upper surface 17a, and a groove 17b carries a deformable O-ring 18 for sealing purposes. The end cap 17 is first depressed as shown in FIG. 1, and then the remote crimped end D of the wire key is inserted into the anchor passage C. It is important that the crimped end D is so pronounced as to avoid insertion thereof together with an intermediate portion E of the wire key through the bore of the anchor passage C. The end cap is then raised into fixed position receiving the leg B in locked position and is then turned as by a spanner wrench which engages the slots A, and the end cap is then turned introducing an arcuate intermediate portion of the wire key into the groove 17c as shown in FIG. 1-4. Crimping of the end D takes place at the time of assembly.

Referring more particularly to FIG. 5, the end cap has a tendency to unwind causing the adjacent edge of the crimped portion D' to dig into the aluminum housing due to the resilient action of the steel wire preventing unwinding. FIG. 6 illustrates the straightening of the crimped end D of the wire key by engagement thereof by the bent portion 20 of the wire causing same to straighten.

Figure 9:
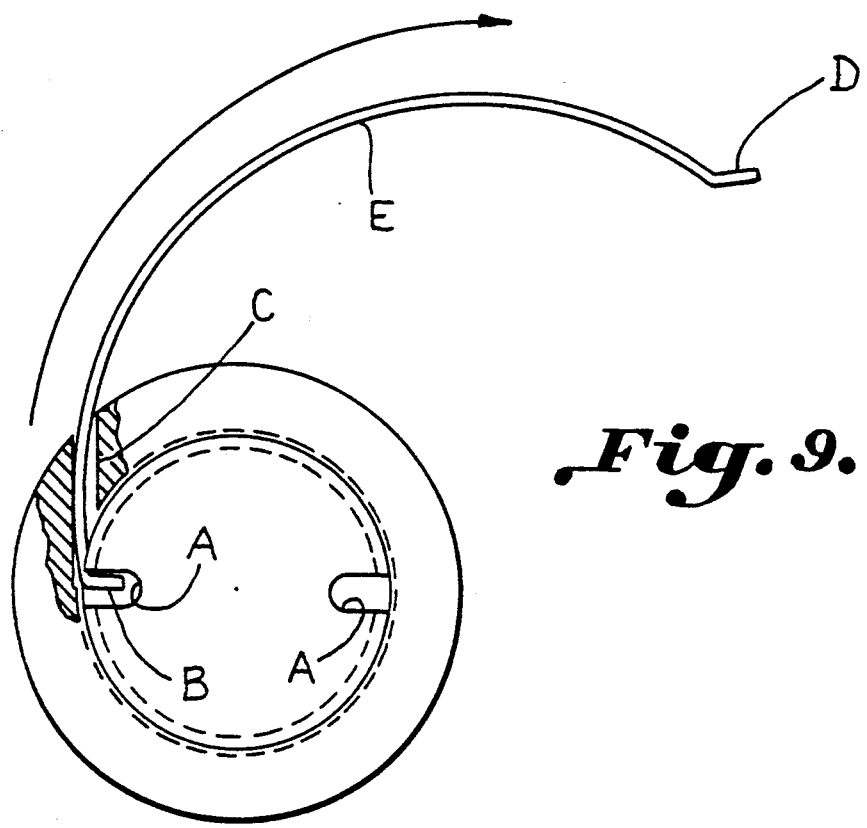
FIG. 9 is a plan view illustrating insertion of the leg of a fully pre-crimped wire key for hooking in the slot.
Figure 8:
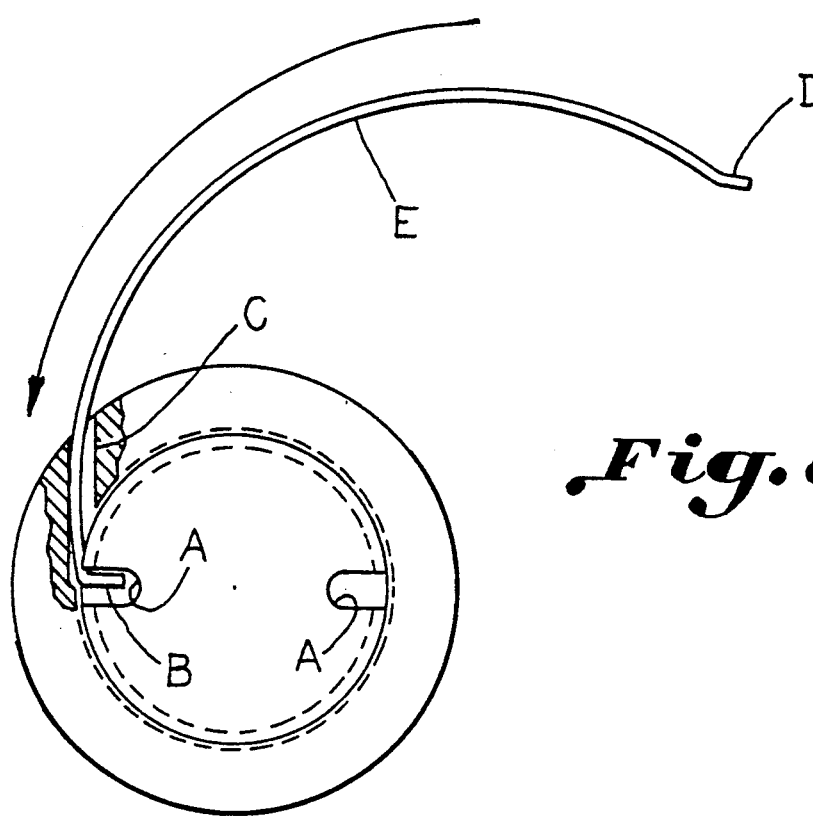
FIG. 8 is a plan view illustrating insertion of the leg of a partially pre-crimped wire key for hooking in the slot.

Several retaining wires have been utilized. One such design provides bends in the wire for retention such that the end of the wire is bent in. Another retaining wire provides bends in the wire facing out for retention as in FIGS. 8 and 9. If desired, the wire key may be only partially pre-bent as in FIG. 8 or fully pre-bent as in FIG. 9. The wire with a bend in has had very favorable results. The problem with this design is that there is no way to disassemble the cylinder.

Tests on cylinders of varying bore sizes show that the cylinders retain the wire outward bend while in use. This construction assures that the wire will not come out of its own accord during use. Moreover, when a cylinder is in need of repair, the end cap is tightened with a spanner wrench. When the retaining wire reaches a 360° wrap, the reverse bend in the wire is encountered and this bend can be straightened directly resulting in the cylinder coming apart with ease.

While a preferred embodiment of the invention has been described using specific terms, such description is for illustrative purposes only, and it is to be understood that changes and variations may be made without departing from the spirit or scope of the following claims.

What is claimed is:

1. A fluid operated cylinder assembly having a cylinder wall, a piston and a fluid port comprising:

an end cap having a pair of opposed slots each forming a recess opening at an outer end surface of said end cap;

a wire key having a leg on one end thereof extending at an angle thereto inwardly in respect to said cylinder and said end cap;

a first anchor groove for receiving an inside portion of said wire key extending about said end cap and opening into said slot;

a second anchor groove extending about said cylinder wall adjacent an end thereof opposite said first anchor groove for receiving an outside portion of said wire key;

an anchor passage in said cylinder through which said wire key may be inserted leg first;

a crimped portion provided at the other end of said wire key being bent and extending in a direction out of alignment with and in the same plane as said leg at an angle permitting passage thereof through said anchor passage in said cylinder and contacting a wall of said anchor passage when said end cap is secured within said cylinder; and an intermediate arcuate section between said leg and said crimped portion.

2. The structure set forth in claim 1 wherein said crimped portion is bent and extends outwardly out of alignment.

3. The method of assembling a fluid operated cylinder assembly having a cylinder wall, a piston, an end cap and a fluid port comprising the steps of:

providing a slot forming a recess in said end cap opening at an outer end surface thereof;

forming a leg on one end a wire key extending at an angle thereto inwardly in respect to said cylinder and said end cap;

inserting said wire key through an angular bore defining an anchor passage in said cylinder leg first;

crimping a portion provided at the other end of said wire key forming a bend extending in a direction out of alignment with and in the same plan as said leg at an angle permitting passage thereof through said anchor passage in said cylinder; and rotating said end cap causing said wire key to be received in a first anchor groove extending about said end cap opening into said slot and in a second anchor groove extending about said cylinder wall adjacent an end thereof opposite said first anchor groove, thereby securing said end cap in said cylinder;

said bend being secured within said angular bore when said end cap is secured within said cylinder.

4. The method set forth in claim 3 comprising crimping said portion outwardly and including the step of dissembling said cylinder wherein the end cap is forcefully rotated through an angle of slightly greater than 360° until said crimped portion encounters said leg removing at least a portion of said bend facilitating removal of said wire key through said anchor passage.

* * * * *